Patented Sept. 13, 1932

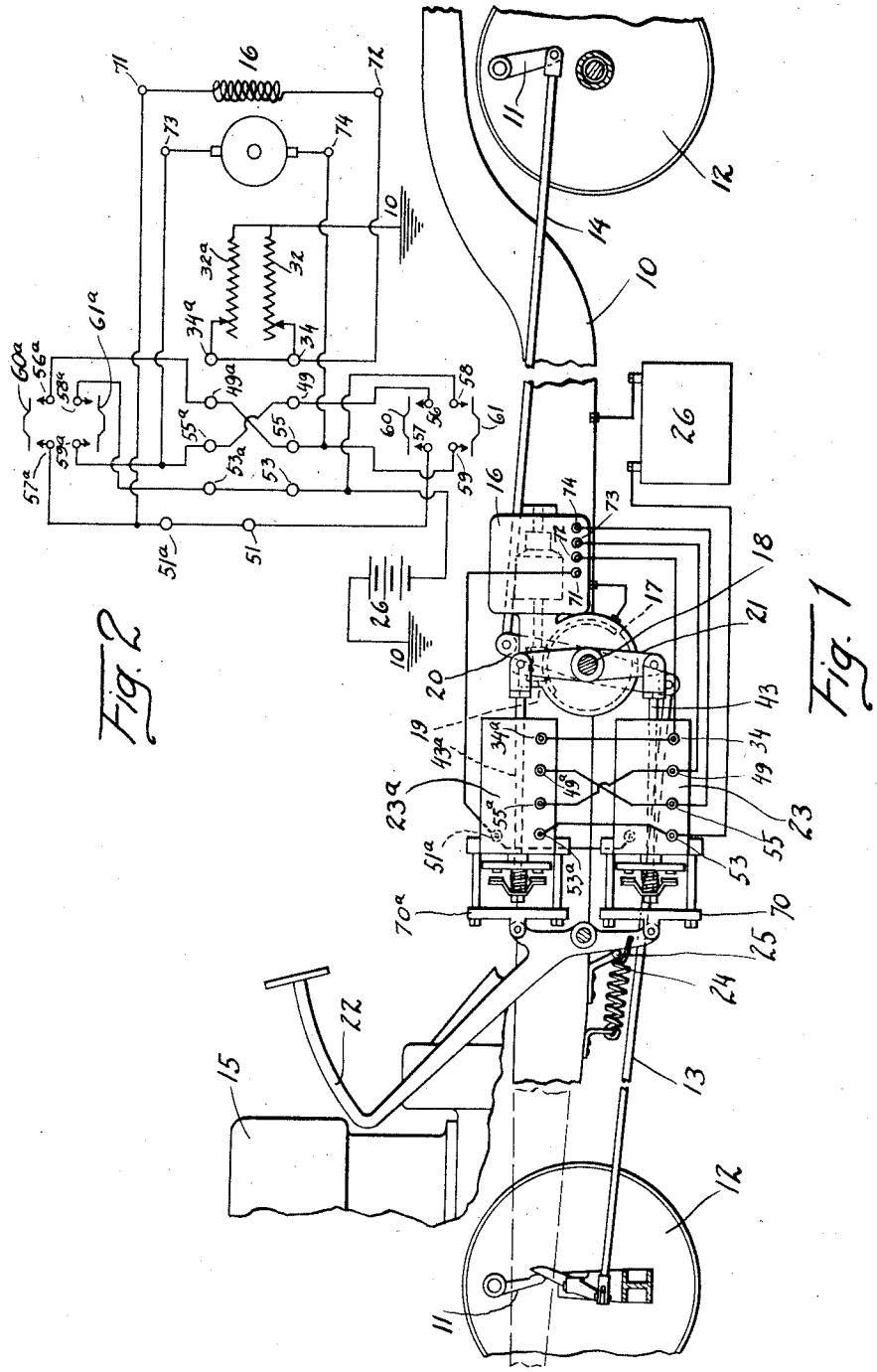

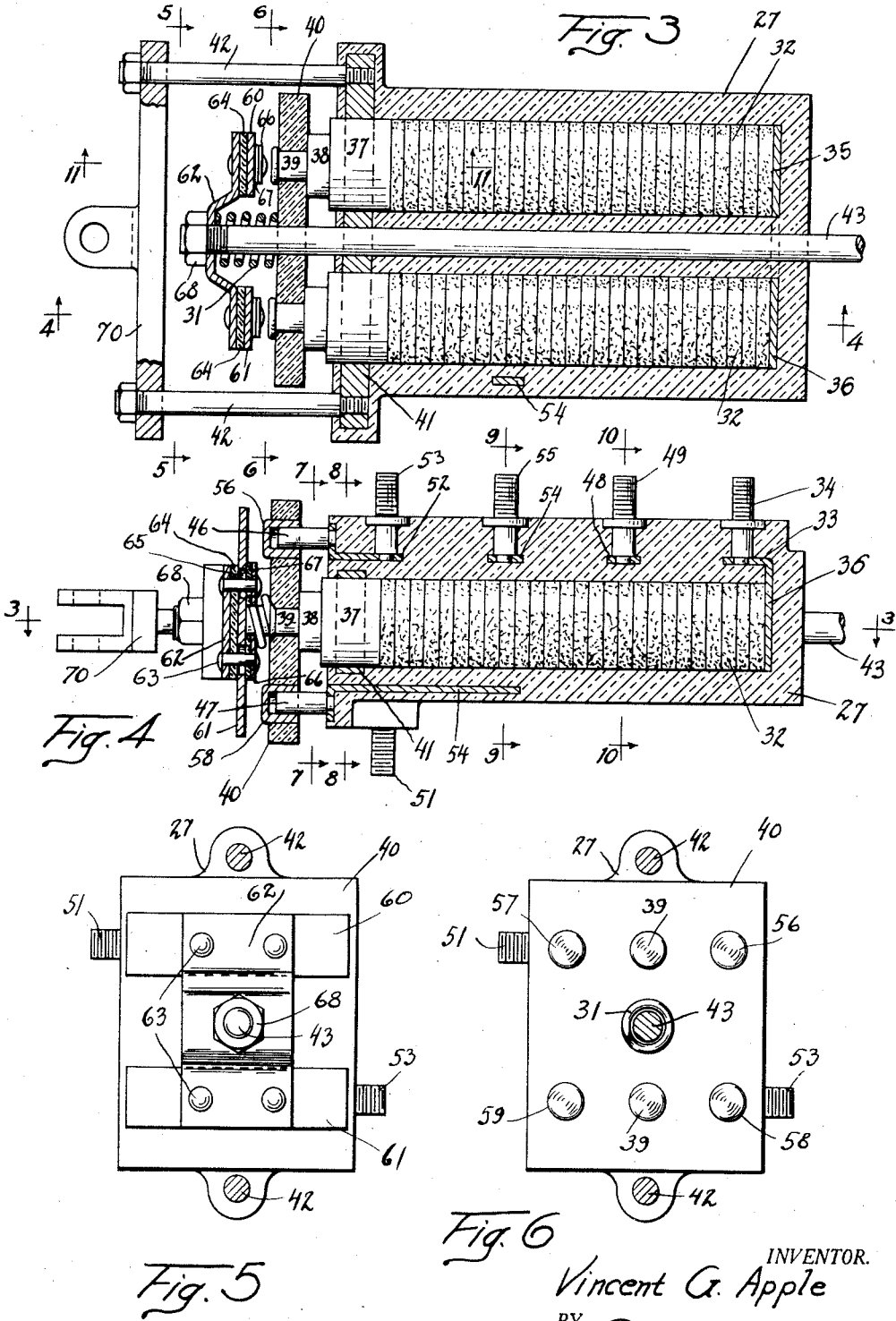

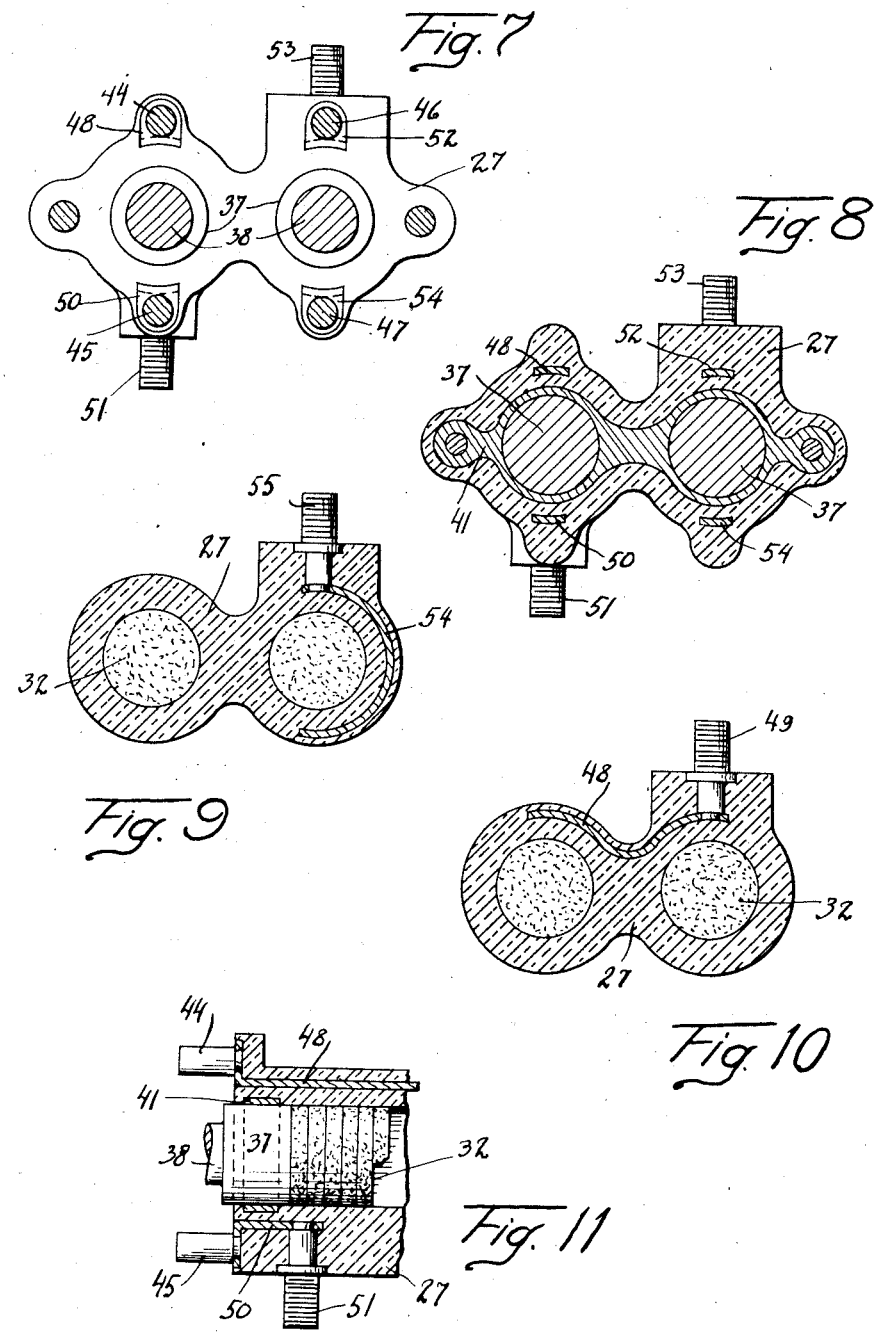

1,876,545

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

BRAKE APPLYING MECHANISM

Application filed June 21, 1930. Serial No. 462,752.

My invention relates to vehicle brakes, and more specifically to means for applying and releasing the brakes positively by the use of an electric motor.

An object of my invention is to enable the vehicle operator to apply the brakes with greater and more effective force while utilizing less physical effort than is usually required for that operation.

Another object of the invention resides in so arranging an electric motor booster mechanism that it is operable to positively apply the brakes on depression of the brake operating member and automatically operable upon release of said member to positively release them, while at the same time permitting normal application of the brakes in the usual manner in the event that the electric mechanism failed for any reason.

Still a further object is to enable the vehicle operator to readily control the amount of braking power transmitted to the brakes from the electric booster in direct proportion to the manual effort exerted upon the operating member. In this way the reaction of the brakes to the manual effort exerted by the operator will be substantially like that of the ordinary mechanical or hydraulic brake operating without assistance of any kind. This will eliminate the necessity of substantially "learning how" to apply the vehicle brakes, as is frequently necessary with power brakes and booster mechanism wherein the full surge of auxiliary power is released to the brakes on initial depression of the operating member. Thus a large element of danger in becoming confused by operation of brakes which react in widely varying ways is eliminated.

In accomplishing the above and other objects of my invention I have used a reversible electric motor, working through a reversible worm gear and controlled by the forward and backward movement of the brake pedal.

In conjunction with this mechanism, I have provided a system of rheostats and switches so arranged that when the brake operating pedal or lever is pushed forward, the force is used to apply the brakes mechanically and at the same time it operates to reduce the resistance of a rheostat in series with the operating motor, causing the motor to aid in applying the actuating force on the brakes. The release of the pedal will automatically reverse the motor connections and cause the motor to aid in releasing the brakes.

I have also illustrated a circuit and control elements for causing a motor to rotate in a given direction when pressure is applied in an operating lever, and to run the motor in the reverse direction for a predetermined number of revolutions when the operating lever is released.

Still other objects and meritorious features of my invention will become apparent from the following description, taken in conjunction with the drawings, wherein:

Fig. 1 is a diagrammatic representation of the elements comprising this invention, Fig. 2 is a circuit diagram of electrical connections, Fig. 3 is a longitudinal vertical section through one of the rheostats, Fig. 4 is a longitudinal horizontal section taken along line 4—4 of Fig. 3, Figs. 5 and 6 are transverse sections taken along lines 5—5 and 6—6, respectively, of Fig. 3, Figs. 7, 8, 9, and 10 are transverse sections taken along lines 7—7, 8—8, 9—9, and 10—10 respectively, of Fig. 4, and Fig. 11 is a fragmentary section taken along line 11—11 of Fig. 3.

Similar numerals refer to like parts throughout the several views.

In Fig. 1 I have illustrated a vehicle chassis frame 10, brake operating arms 11 in conjunction with each of the wheel assemblies 12, and mechanical brake linkage including connecting rods 13 and 14. An engine 15 is diagrammatically shown seated on the chassis frame.

A motor power unit 16 consists of a reversible electric motor with a worm gear reduction attached and with the worm wheel 17 keyed to the operating shaft 18. The helix angle of the worm 19 is such that the armature may be revolved by applying torque to the worm wheel shaft, the angle being small enough to require considerable effort to cause the worm to rotate. On the operating shaft 18 are mounted a double ended pull rod lever 20 and a control lever 21. Between control lever 21 and pedal 22 are mounted two combined switch and rheostat controllers 23 and 23—a. A return spring 24 tends to keep pedal 22 against stop pin 25. The battery 26 is connected to controllers 23 and 23—a and to the frame of the vehicle. The pedal, motor and shafts are all connected to the frame so as to form a return circuit to the battery.

Figs. 3 to 11 show one of the combined switch and rheostat controllers in detail and on an enlarged scale.

The body 27 is composed of insulation of a high fire-resisting nature molded to the form shown with two longitudinally extending barrels each containing a stack of carbon discs 32. At the bottoms of the barrels each stack of discs rests on the same metal stamping 33 which has one end connected to the binding post 34 the other part comprising the two ears 35 and 36 which cover the bottoms of the disc barrels. By this means the bottom disc of each stack is electrically connected to binding post 34.

Two metal plungers 37 fit into the open ends of the disc barrels and are adapted to compact the stacks of discs. Plungers 37 are reduced in diameter at 38 and again at 39. At 39 they fit and are securely riveted into the switch terminal plate 40. A metal yoke 41 (see Figs. 3 and 8) is imbedded in the insulation body 27 near the open ends of the disc barrels and by this yoke the tops of the stacks of carbon discs 32 are electrically connected to the brake rods 42 and 43 and through them to the frame of the vehicle to which one terminal of the battery is also connected. This provides an electrical circuit from the binding post 34, through the two stacks of discs 32 in parallel, to the frame of the vehicle.

Near the open ends of the disc barrels in body 27 there emerge from the insulation four contact pins 44, 45, 46, and 47. Pin 44 is riveted into the metal strip 48 which extends through the body 27, first longitudinally as in Fig. 11 then downward as in Fig. 10 to the binding post 49. Pin 45 is riveted into metal strip 50 which extends longitudinally to binding post 51. Pin 46 is riveted to the metal strip 52 and through it connects to binding post 53. Pin 47 is riveted into metal strip 54 which extends first longitudinally as in Fig. 4 then in a half circle as in Fig. 9 to the opposite side where it is secured to binding post 55. Any of the binding posts may be electrically connected to each other by suitably connecting the proper contact pins to each other.

The four contact pins 44, 45, 46, and 47 are capped by metal contact cups 56, 57, 58, and 59 respectively. These contact cups are imbedded in the switch terminal plate 40 and the pins do not quite reach the bottom of the cups. By this arrangement pressure may be applied to plate 40 to compress discs 32 through plungers 37 yet contact between the cups 56, 57, 58 and 59 and their corresponding pins will at all times be maintained. By electrically connecting certain of the cups to each other the pins which they contain will be connected also.

The means for connecting certain of the contact cups together comprises two metal strips 60 and 61, extending crosswise of a yoke 62 and secured thereto, as by rivets 63. (See Figs. 4 and 5). Strips 60 and 61 however are electrically insulated from each other and from yoke 62 by insulation strips 64. Clearance holes 65 prevent rivets 63 from touching strips 60 or 61, the rivets being headed over against metal washers 66 which are separated from the strips by insulation washers 67. A nut 68 holds yoke 62 to rod 43. A spring 31 normally keeps strips 60 and 61 away from the contact cups to keep the circuit open, but a pull on the rod 43 in one direction against a pull on the yoke 70 in the other direction will compress the spring 31, join contact cup 56 to 57 with strip 60, and join contact cup 58 to 59 with strip 61.

Two of these controllers (only one being shown in Figs. 3 to 11) are employed in the present braking system one being indicated at 23 and the other at 23a, Fig. 1. The motor has four binding posts, two for the field and two for the armature, indicated by the numerals 71, 72, 73, and 74.

By providing and attaching cables which connect motor posts 71 to controller posts 51a and 51 (not shown in Fig. 1), motor post 72 to controller posts 34 and 34a, motor post 73 to controller post 49 and 55a, motor post 74 to controller posts 55 and 49a, one battery terminal to controller posts 53 and 53a, and the other battery terminal to the frame of the vehicle, a circuit as more clearly shown in the diagram Fig. 2 is provided.

The operation is as follows:—

Pressure on pedal 22 pulls on yoke 70a. Rod 43a remains stationary until strips 60a and 61a join the contact cups 56a to 57a and 58a to 59a. By tracing out the circuit with these connections made it will be seen that current travels through the armature and field in the same direction.

Release of pedal 22 permits spring 24 to pull on yoke 70. Rod 43 remains stationary until strips 60 and 61 join the contact cups 56 to 57 and 58 to 59. By tracing out the circuit with these connections made it will be seen that current travels through the armature in one direction and through the field in the other direction.

Thus depressing the pedal causes the motor to revolve in one direction and releasing it to revolve it in the other, and while the degree of pressure on pedal 22 determines the manual effort exerted to apply the brake, variation in this pressure produces a corresponding variation in the electrical effort of the motor due to variation in the resistance of the stacks of carbon discs under different pressures.

The use of a reversible worm gear on shaft 18 allows the operation of brakes by manual effort even through the electric circuit should not function, the pull on the casing of controller 23a being transmitted to the rod 43a and lever 21 through the rheostat discs.

Various other modifications will become apparent to those skilled in the art and for that reason I intend to limit myself only within the scope of the appended claims.

What I claim is:

1. In combination with a power brake, booster mechanism controllable by a normally operated member in accordance with the manual effort exerted therein, means automatically operable on release of pressure from said member to reverse the operation of said booster mechanism, said means including means for decelerating the power of said booster during its reverse operation in direct proportion to the resistance offered by the brakes to effect a smooth positive release of the brakes.

2. Brake mechanism comprising, in combination, brakes, a double ended brake operating member pivoted intermediate its extremities, and tension transmitting connections between each of said extremities and the brakes whereby movement of the operating member in one direction positively applies said brakes and in the other positively releases them.

3. Brake mechanism comprising, in combination, a brake actuating shaft rotatably journalled, power mechanism operatively coupled with said shaft, a double ended operating member pivoted intermediate its extremities, a yieldable connection between each of said extremities and said actuating shaft, one of said connections including means for rendering said power mechanism operative to rotate the actuating shaft in one direction and the other in the reverse direction, and each of said connections including means for controlling the power transmitted in direct proportion to the tension in said yieldable connection.

4. Brake mechanism comprising, in combination, brakes, electric power means coupled therewith to exert brake applying effort thereon, a manually operable member coupled with the brakes through a pair of parallel tension elements to apply or release the brakes, said parallel tension elements arranged in the circuit with said electric power means to regulate the electric power output thereof.

5. Brake mechanism comprising, in combination, brakes, power means coupled through tension linkage therewith to positively apply and release the brakes, a manually operable member connected through tension linkage with said brakes to apply and release the brakes, said last named tension linkage including means operable to regulate the power effort applied to the brakes in application and release.

6. Brake mechanism comprising, in combination, brakes, power means coupled therewith to apply and release the brakes, a pivotally supported brake pedal, tension linkage connecting the pedal with the brakes on one side of its pivot to apply the brakes, tension linkage connecting the brakes with the pedal on the opposite side of its pivotal support to release the brakes.

7. In combination with brake mechanism, a power device coupled therewith, a pair of control units for said power device, and a manually operable member coupled with each of said control means, said pair of control means, being operable to vary the power transmitted to the brakes upon application and release movement respectively of the manually operable member.

In testimony whereof, I, VINCENT G. APPLE, sign this specification.

VINCENT G. APPLE.